United States Patent [19]

Streitberger et al.

[11] Patent Number: 4,482,446
[45] Date of Patent: Nov. 13, 1984

[54] ARTICLE AND METHOD OF ELECTRODEPOSITION OF AQUEOUS DISPERSIONS WITH FINELY-DIVIDED, NON-IONIC PLASTICS

[75] Inventors: Hans-Joachim Streitberger; Peter Lessmeister, both of Münster; Norbert Zdahl, Ascheberg, all of Fed. Rep. of Germany

[73] Assignee: BASF Farben & Fasern A.G., Hamburg, Fed. Rep. of Germany

[21] Appl. No.: 394,678

[22] Filed: Jul. 2, 1982

Related U.S. Application Data

[62] Division of Ser. No. 154,871, May 30, 1980, Pat. No. 4,361,660.

[30] Foreign Application Priority Data

Jun. 11, 1979 [DE] Fed. Rep. of Germany ........ 2923589

[51] Int. Cl.$^3$ .............................................. C25D 13/00
[52] U.S. Cl. ................................ 204/181 C; 428/416; 428/418; 428/458; 428/460
[58] Field of Search ............... 523/404, 415, 417, 424, 523/414; 524/901, 39; 204/181 C; 525/109, 423, 438, 454, 526; 428/418, 460, 458

[56] References Cited

U.S. PATENT DOCUMENTS 3,869,366  3/1975  Suzuki et al. .......................... 204/181
3,994,989  11/1976  Kempter et al. ............. 260/29.2 EP
4,189,450  2/1980  Kempter et al. ............. 260/29.2 EP Primary Examiner—Theodore E. Pertilla
Attorney, Agent, or Firm—Wells & Wells

[57] ABSTRACT

An aqueous dispersion based on an acid-protonized reaction product from
(a) Mannich bases free from epoxide groups, from
(a$_1$) condensed phenols free from ether groups with at least two aromatic rings and with at least two phenolic hydroxyl groups and/or
(a$_2$) condensed phenols, containing ether groups, with at least two aromatic rings and at least one phenolic hydroxyl group
(a$_3$) secondary amines with at least one hydroxyalkyl group, possible in a mixture with
(a$_4$) secondary dialkylamines or dialkoxyalkylamines without free hydroxyl groups,
(a$_5$) formaldehyde or compounds splitting off formaldehyde, with
(b) epoxide resins, aliphatic hydroxyl groups from (a) and/or (b) being converted at least in part into urethane groups possibly by reaction with partly blocked isocyanates, containing furthermore fine-particulates non-ionic plastics in dispersed form. The dispersion and/or the fine-particulate plastics furthermore may contain pigments and/or fillers. The dispersion is suitable as an electrodip means for coating on electrically conducting substrates acting as the cathodes in an electro-dip enameling process.

14 Claims, No Drawings

ARTICLE AND METHOD OF ELECTRODEPOSITION OF AQUEOUS DISPERSIONS WITH FINELY-DIVIDED, NON-IONIC PLASTICS

This is a division of application Ser. No. 154,871, filed May 30, 1980, U.S. Pat. No. 4,361,660, issued Nov. 30, 1982.

The invention relates to an aqueous dispersion composed of finely divided plastics. It is suitable as an electrocoating bath for the production of coatings on electrically conducting substrates which are connected as the cathode in an electrocoating lacquering process.

Aqueous disperisons of plastics which produce film formation under the influence of heat, or produce cross-linking, are known. When used by the conventional methods of application of brushing, dipping and spraying, they produce fault-free, serviceable coatings.

The object of the present invention was to enable aqueous dispersions composed of finely divided plastics also to be used in an electrocoating lacquering process as an electrocoating bath, the substrate to be coated being connected as the cathode while direct current is being passed and the coating bath having a pH value between 7 and 9. The conventional cationic systems, by means of which it is possible to coat the electrically conducting substrates, connected as the cathode, in an electrocoating lacquering process by applying direct current or alternating current, have a bath pH value considerably below 7. A low pH value results from neutralizing the cationic resin with acid. The consequence of a pH value in the acid range is increased corrosion of the installation in the liquid and gaseous phases.

The extent of the dissociation of the acid used for dispersing and for neutralizing varies according to the pH value of the electrocoating bath. The undissociated fraction is larger at a low pH value of the bath and, depending on the vapor pressure of the acid and on the temperature of the bath, this fraction is responsible, to a varying extent, for the corrosive attack on the material of the installation in the liquid and gaseous phases.

The object has been achieved, surprisingly, by means of an aqueous dispersion composed of finely divided plastics, wherein finely divided, nonionic plastics are dispersed in an aqueous solution and/or aqueous dispersion, having a pH value between 7 and 9, of a product, protonated with acids, from the reaction of (a) Mannich bases which are free from epoxide groups and are formed from ($a_1$) condensed phenols which are free from ether groups and contain at least two aromatic rings and at least two phenolic hydroxyl groups, and/or ($a_2$) condensed phenols which contain ether groups and contain at least two aromatic rings and at least one phenolic hydroxyl group, ($a_3$) secondary amines having at least one hydroxyalkyl group, if appropriate mixed with ($a_4$) secondary dialkylamines or dialkoxyalkylamines which do not contain free hydroxyl groups, and ($a_5$) formaldehyde or compounds which split off formaldehyde, with (b) epoxide resins, aliphatic hydroxyl groups originating from (a) and/or (b) being optionally converted, at least partially, into urethane groups by reaction with partially blocked isocyanates.

Aqueous dispersions which are preferentially suitable are those containing pigments and/or fillers and/or water-miscible organic solvents which do not either incipiently dissolve or incipiently swell the finely divided plastics.

In a particularly preferred embodiment of the invention, the finely divided, nonionic plastics can already contain pigments and/or fillers.

The invention also relates to the use of the aqueous dispersions according to the invention for the production of coatings on the surface of electrically conducting substrates, connected as the cathode, by cathodic deposition from a coating bath in a cathodic electrocoating lacquering process and subsequently stoving the coating.

Both the finely divided, nonionic plastics and the reaction product formed from Mannich bases and epoxide resins can be cathodically deposited evenly at a pH value above 7 from the aqueous dispersions according to the invention, and they produce, after a brief coating time, coatings of up to 150 μm which have, after stoving, outstanding mechanical properties, such as high hardness and scratch resistance together with good elasticity and firm adhesion to the substrate.

After stoving at temperatures of up to 200° C., for a stoving time of about 15 minutes, the coatings have exceptionally good corrosion resistance. Values up to 1,000 hours are achieved in the salt spray test as specified in German Industrial Standard DIN 50,021. The electrochemical efficiency is high; the electrochemical equivalent is 5 to 20 coulombs (C) per gram of coating deposited.

It has also been found that the surface of the stoved coating is so smooth that a single top layer of lacquer is sufficient to achieve a lacquer coating with a good appearance.

The reaction product formed from Mannich bases which are free from epoxide groups, and epoxide resins is present in a protonated form in the aqueous dispersion according to the invention and acts as a carrier resin for the finely divided, nonionic plastics. It will be designated "carrier resin" in the text which follows. The carrier resin is protonated by means of suitable inorganic and/or organic acids, preferably water-soluble carboxylic acids, and, in the protonated form, it is soluble or dispersible in water or can be mixed and diluted with water. The pH value of the aqueous solution or aqueous dispersion is adjusted to a value between 7 and not more than 9.

Suitable acids are virtually all known inorganic and organic acids, such as, for example, hydrochloric acid, sulfuric acid, phosphoric acid, carbonic acid, p-toluenesulfonic acid, acetic acid, propionic acid, formic acid, citric acid, lactic acid, malic acid, fumaric acid, maleic acid and phthalic acid and also the half-esters of fumaric acid, maleic acid and phthalic acid with monohydric or polyhydric aliphatic alcohols, such as methanol, ethanol, propanol or ethylene glycol. The best results are obtained using acetic acid, lactic acid and formic acid, which are therefore suggested as preferentially suitable protonating agents. The carrier resin is preferably used in coating agents for the cathodic electrocoating lacquering of electrically conducting substrates, for example metal parts made of aluminum, brass, copper, iron, steel and iron alloys containing other metals, which can be given a chemical pre-treatment, for example can be phosphatized.

The preparation of the protonated reaction product formed from Mannich bases which are free from epoxide groups, and epoxide resins is known from German Offenlegungsschrift No. 2,751,499 and is not claimed in this text.

In order to characterize the reaction product unambiguously, however, the following should be stated in regard to the individual components:

The Mannich bases (a) containing no epoxide groups are prepared from (a$_1$) condensed phenols which are free from ether groups and contain at least two aromatic rings and at least two phenolic hydroxyl groups, and/or (a$_2$) condensed phenols which contain ether groups and contain at least two aromatic rings and at least one phenolic hydroxyl group, (a$_3$) secondary amines having at least one hydroxyalkyl group, if appropriate mixed with (a$_4$) secondary dialkylamines or dialkoxyalkylamines which do not contain free hydroxyl groups, and (a$_5$) formaldehyde or compounds which split off formaldehyde.

Condensed phenols which are free from ether groups and contain at least two aromatic rings and at least two phenolic hydroxyl groups (a$_1$) which are particularly suitable are condensed phenols of the general formula

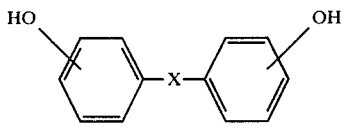

wherein the hydroxyl groups are in the ortho-position or para-position in relation to X and X is a straight-chain or branched, divalent aliphatic radical having 1 to 3 carbon atoms, or SO$_2$, SO or

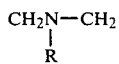

(in which R=alkyl radical having 1 to 6 C atoms); bisphenol A is particularly suitable. Low-molecular reaction products formed from phenols and formaldehyde, so-called novolacs, can also be employed.

If appropriate, it is possible to use, as a mixture with the condensed phenols (a$_1$) or instead of the latter, further condensed phenols (a$_2$) which contain at least one phenolic hydroxyl group and, in addition, also one or more ether groups in the molecule. These products have the general formula

and/or

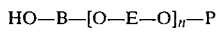

wherein B represents the radical

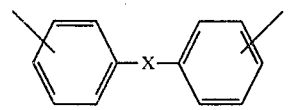

and X has the meaning indicated above, E represents a radical which contains hydroxyl groups and has been obtained by adding an epoxide compound onto a phenolic hydroxyl group, P represents a phenyl or alkylphenyl radical and n represents an integer from 1 to 3, and wherein epoxide resins, such as, for example, diglycidyl ethers of bisphenol A, pentaerythritol, glycerol, trimethylolpropane, glycol, glycol ethers and other polyhydric, preferably dihydric to tetrahydric alcohols, are preferably employed as the epoxide compounds (for E).

If the condensed phenols (a$_2$) are to be used on their own, it is appropriate to select those based on triglycidyl or tetraglycidyl ethers.

Other suitable compounds containing epoxide groups are nitrogen-containing diepoxides, such as are described in U.S. Pat. No. 3,365,471, epoxide resins obtained from 1,1-methylene-bis-(5-substituted hydantoin) in accordance with U.S. Pat. No. 3,391,097, diepoxides obtained from bisimides in accordance with U.S. Pat. No. 3,450,711, epoxylated aminomethyldiphenyl oxides according to U.S. Pat. No. 3,312,664, heterocyclic N,N'-diglycidyl compounds according to U.S. Pat. No. 3,503,979, aminoepoxy phosphates according to British Patent Specification No. 1,172,916 or 1,3,5-triglycidyl isocyanurates.

Components (a$_2$) which are particularly preferred are the products formed from the reaction of diglycidyl ethers of bisphenol A or of polyhydric aliphatic alcohols, such as pentaerythritol, trimethylolpropane and glycerol, with bisphenol A and, if appropriate, phenol, which contain phenol groups and are virtually free from epoxide groups. Such products generally have molecular weights from 650 to 1,300 and epoxide values from 0.004 to 0.01 and can be prepared, for example, at temperatures between 160° and 180° C., or at correspondingly lower temperatures in the presence of catalysts for the reaction.

The condensed phenols (a$_2$) contain aliphatically linked hydroxyl groups. Some of these are formed from the epoxide groups of the epoxide resins (E) in the reaction of the latter with the bisphenols (B) or with the phenols (P). However, hydroxyl groups can also already be present in the epoxide resins themselves, if the latter have been prepared by reacting alcohols of a functionality higher than dihydric (for example pentaerythritol, trimethylolpropane or glycerol) with 2 moles of epichlorohydrin.

In the case which is in itself preferred, in which mixtures of the components (a$_1$) and (a$_2$) are employed, the ratio by weight of the two components is between 1:0.1 and 1:5.

Examples of suitable secondary amines (a$_3$) which contain at least one hydroxyalkyl group, are alkylethanolamines or alkylisopropanolamines having 1 to 6 carbon atoms in the alkyl group. Dialkanolamines of alcohols having 2 to 6 carbon atoms, in particular diethanolamine, and also mixtures of these dialkanolamines with alkylalkanolamines are preferred, however.

The secondary amines (a$_3$) which are incorporated in the Mannich bases (a) as dialkanolaminomethyl groups and alkylalkanolaminomethyl groups, are of considerable importance for the degree of dispersibility of the binders in the desired pH range of 6.0 to 10.2 and for the crosslinking of the system.

Suitable secondary dialkylamines or dialkoxyalkylamines (a$_4$) which are employed conjointly with the amines (a$_3$) containing hydroxyalkyl groups for the preparation of the Mannich bases, are those of the general formula

in which $R_1$ and $R_2$ are identical or different and represent a straight-chain or branched aliphatic radical which has 2 to 10 carbon atoms and can contain alkoxy groups. Examples of suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, such as, for example, di-2-methoxyethylamine, di-2-ethoxyethylamine or di-2-butoxyethylamine, and also secondary amines in which $R_1$ and $R_2$ are linked to form a ring, such as, for example, morpholine or piperidine.

Di-n-butylamine, di-2-ethylhexylamine and di-n-hexylamine are preferentially suitable. The mode of action of these secondary amines ($a_4$) consists chiefly in influencing the stability properties of the binders, in addition they contribute to the levelling and to the "internal plasticization" of the lacquer films produced from the binders. They also make a certain contribution to the crosslinking.

As a result of their mode of preparation, the secondary amines can also contain, inter alia, proportions of corresponding primary amines, but the proportion of these should not exceed 20 percent by weight of the secondary amines. The ratio by weight of the components ($a_3$) and ($a_4$) can be between 1:10 and 1:0.1, preferably between 1:2 and 2:1.

Aqueous or alcoholic, such as, for example, butanolic, solutions of formaldehyde or paraformaldehyde or mixtures thereof are used as formaldehyde or compounds which provide formaldehyde ($a_5$).

The Mannich bases (a) are prepared by the customary methods indicated in the literature (compare, for example, Houben-Weyl, Methoden der organischen Chemie ("Methods of Organic Chemistry"), Volume XI/1, page 731 (1957)), preferably by carrying out the reaction at temperatures between 20° and 80° C. The proportions of the starting materials employed depend on the particular properties desired, the molar ratio of the components ($a_1$) and ($a_2$) to the components ($a_3$) and ($a_4$) being preferably 1:0.75 to 1:3. In general, however, about one mole of secondary amine is employed for each phenolic hydroxyl group. The quantity of ($a_5$) is at least one mole, relative to one mole of secondary amine.

The Mannich bases (a) which are free from epoxide groups are reacted in a quantity of 50 to 90, preferably 60 to 80, percent by weight, with 5 to 50, preferably 10 to 30, percent by weight of epoxide resin-component (b). The reaction of the component (a) with the component (b) is generally carried out at temperatures from 20° to 100° C., preferably 60° to 80° C., if appropriate in the presence of organic solvents, such as, for example, alcohols, glycol ethers and ketones. The reaction product obtained is substantially free from epoxide groups.

The reaction of (a) with (b) to give the reaction product is described in patent applications German Published Specification No. 2,419,179, German Published Specification No. 2,320,301, German Published Specification No. 2,357,075, German Published Specification No. 2,541,801 and German Published Specification No. 2,554,080.

Suitable epoxide resins (component b) are preferably polyepoxide compounds having 2 to 3 epoxide groups in the molecule, such as, for example, products from the reaction of polyhydric phenols, particularly those of the formula

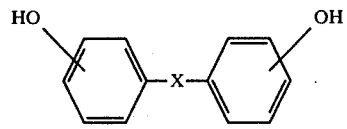

mentioned under ($a_1$), with epichlorohydrin; but also the abovementioned products from the reaction of polyhydric alcohols, such as, for example, pentaerythritol, trimethylolpropane or glycerol, with epichlorohydrin; also products, containing epoxide groups, from the reaction of epoxide resins with secondary amines or glycol ethers containing hydroxyl groups; and also epoxide resins which contain incorporated heteroatoms, such as sulfur.

In general, the epoxide resins (b) also contain aliphatically linked hydroxyl groups, particularly if a condensation reaction to form higher-molecular products has taken place in the reaction of the polyhydric alcohol.

Some of the aliphatically linked hydroxyl groups from (a) or (b) can, if appropriate, be converted into urethane groups. The reaction of the hydroxyl groups with the partially blocked polyisocyanates can be carried out at any desired stage of the preparation of the binders; it is preferable to react the epoxide resins. This can be effected not only with the epoxide resins constituting the component (b) but also with the epoxide resins (E) which are employed for the preparation of the component ($a_2$). It is also possible to react the finished component ($a_2$) directly with the partially blocked polyisocyanate. If epoxide resins based on polyhydric aliphatic alcohols, for example pentaerythritol, are used, the attack of the isocyanate takes place preferentially at the free primary alcohol group; there is only a secondary reaction at the secondaery alcohol group which has been formed from the epoxide ring. Under the conditions selected, phenolic hydroxyl groups remain in the main unchanged. Any amino or imino groups which may be present can also react with the partially blocked polyisocyanates, which can be desirable in some cases.

The reaction is usually carried out at temperatures from 50° to 120°, preferably from 70° to 100°C., and conventional catalysts for the formation of polyurethanes, such as, for example, dibutyltin dilaurate, can be present. The reaction is carried out in the absence of polar solvents; it is preferable to carry out the reaction in the melt, but inert diluents can also be present.

Aromatic diisocyanates, such as toluylene diisocyanates or xylylene diisocyanates or dimers and trimers thereof, are particularly suitable as partially blocked polyisocyanates. However, it is also possible to use aliphatic diisocyanates, such as hexamethylene diisocyanate, and also prepolymers which are prepared by reacting polyols or polyether polyols with an excess of polyisocyanates. Preferential blocking agents are aliphatic alcohols, which can have a straight-chain, branched or ring-like structure, such as, for example, methanol, ethanol, n-, iso- or tert.-butanol, hexanol, ethylhexanol, furfuryl alcohol, cyclohexanol, alkylglycols, alkyldiglycols and alkyltriglycols. Other known blocking agents, such as oximes, lactams, ketones or malonic esters can, however, also be used.

It is possible, without difficulty, to modify only a fraction of the Mannich bases (a) or of the epoxide resins (b) with polyisocyanates, whether this is because epoxide compounds containing or not containing aliphatic hydroxyl groups are present alongside one another or whether further, unmodified epoxide compounds are added after the reaction with polyisocyanate has been carried out.

The proportions in the reaction with the partially blocked polyisocyanates are preferably so chosen that there is 0.01 to 1.0, preferably 0.05 to 0.5, mole of urethane groups to one mole of basic nitrogen in the finished reaction product, counting both the urethane bond between the reaction product and polyisocyanate and the urethane bond between blocking agent and polyisocyanate. The whole structure of the reaction product makes it possible to ensure that, after it has been protonated with acids as a carrier resin, finely divided, nonionic plastics can be dispersed in it in such a way that stable aqueous dispersions are formed, at a pH value of over 7, from which the cathodic deposition of the coatings can be carried out at these pH values of between 7 and 9.

In its protonated form, the carrier resin can be diluted with water. If required, it is possible for additional solvents, which must, however, be selected in such a way that they do not either incipiently dissolve or incipiently swell the finely divided, nonionic plastic, also to be present, such as, for example, alcohols, such as isopropanol, propanol or butanol, glycols or glycol ethers, such as ethylene glycol, propylene glycol, ethylene glycol monoethyl ether, ethylene glycol monopropyl ether or ethylene glycol monobutyl ether, or other solvents, such as tetrahydrofuran, aliphatic and/or aromatic hydrocarbons, esters, ethers or ether-esters, in order to affect advantageously the dissolving properties and dispersing properties of the carrier resin.

It is an important characteristic of the invention that the aqueous dispersion contains nonionic plastics dispersed in it as the finely divided plastics. The finely divided, nonionic plastics are described as "plastic powders" in the text which follows. In the form of powder lacquers, they have already gained acceptance in the field of lacquering metal objects. These plastic powders are solid and easy to grind from room temperature up to temperatures of 100° C. They are not reactive in the sense of undergoing film formation to give high-molecular materials at temperatures as low as room temperature on their own or together with other compatible resins, such as the cationic carrier resin. However, under the conventional stoving conditions, which are at about 160° C., they melt and combine with the cationic carrier resin on the coated substrate to form a compatible film.

Suitable finely divided, nonionic plastics within the scope of this invention are plastic powders belonging to the group comprising epoxide resins, polyester resins, acrylate resins, polyurethane resins, polyamide resins, polyethylene, polypropylene and cellulose acetobutyrates. These plastic powders are all known and most of them are available commercially. All the powders of this type can be employed in the aqueous dispersion according to the invention, provided that they are compatible with the carrier resin. Incompatibility can readily be recognized by the fact that the coating separates into two layers when stoved. The plastic powder can be dispersed in this form in the aqueous dispersion. However, it is also possible to use a plastic powder containing fillers. In this case, the pigments and/or fillers have already been incorporated into the plastic powder during the preparation of this powder. The aqueous dispersion itself can then be free from pigments.

The aqueous pigment according to the invention is not limited merely to containing a single nonionic synthetic resin. Mixtures of two or more different plastic powders can also be present. In this case one or other plastic powder can contain pigments and/or fillers, but the other plastic powder can be free from these additives.

Apart from the pigments and fillers, the plastic powders employed can also contain small quantities of hardening agents and other additives which regulate the flow behaviour of the powder during stoving. The action of these additives incorporated into the plastic powder cannot be adversely affected by the aqueous dispersion.

As is customary in other coating agents, the aqueous dispersion can similarly contain auxiliaries which can be deposited by electrophoresis, such as, for example, pigments, fillers, hardening catalysts, agents for improving flow, anti-foaming agents, agents for improving adhesion and others.

The ratio between the carrier resin and the plastic powder is important for using the aqueous dispersion for the production of stoved coatings on the surface of electrically conducting substrates, connected as the cathode, by cathodic deposition from a coating bath in a cathodic electrocoating lacquering process, and the average particle size of the plastic powder is also important for the quality of the coating deposited.

The best results are obtained in the cathodic deposition if there are 0.1 to 100 parts by weight of plastic powder, preferably 0.5 to 10 parts by weight of plastic powder, to 1 part by weight of carrier resin, relative to the pigment-free and filler-free powder. Besides the carrier resin and the plastic powder, the aqueous dispersion also contains, additionally, 0 to 10 parts by weight of pigments and/or fillers, preferably 2 to 5 parts by weight.

The particle size of the plastic powder is an important factor. The plastic powder should have a particle size distribution in which at least 95% of the particles are smaller than 30 $\mu$m. The best results are obtained using plastic powders, which are therefore preferred, in which at least 95% of the particles are smaller than 10 $\mu$m. It has been found that the particles of the plastic powder are more readily coated by the carrier resin as their size decreases. For this reason the cathodic deposition of finer particle sizes is easier and more even.

The aqueous dispersion is prepared by the methods which are known in the paint industry. Thus the plastic powder can be stirred directly into the aqueous solution or dispersion of the protonated carrier resin by means of a high-speed dispersing apparatus. Another possible means consists in jointly incorporating the plastic powder, together with the desired pigments and/or fillers, into the aqueous solution of the protonated carrier resin in a ball mill or a stirred ball mill.

A further possible means of preparing the aqueous dispersion consists in mixing an aqueous suspension of a plastic powder directly into the aqueous solution of the carrier resin. This method dispenses with the involved grinding process by means of a sand mill, a triple roll mill or a stirred ball mill.

In order to facilitate the preparation of the aqueous dispersion, it is possible to effect the incorporation of the solid component in the presence of small quantities of emulsifiers. Examples of suitable emulsifiers are non-ionic emulsifiers of the type of ethylene oxide adducts of varying chain lengths, such as, for example, alkylphenols modified with ethylene oxide, for example tertiary octylphenol which has been modified with 5 to 40 ethylene oxide units. Also higher aliphatic alcohols modified with ethylene oxide, such as, for example, lauryl alcohols containing 15 to 50 ethylene oxide units, and also similarly modified long-chain mercaptans, fatty acids or amines. Preferred mixtures consist of at least two ethylene oxide adducts in which the ethylene oxide units have different values. The bath stability and the properties of the coating are not substantially affected by the additives.

Cationic emulsifiers, such as, for example, low-molecular amino compounds which contain OH groups and which have been protonated with organic or inorganic acids, are also suitable. The quantities of emulsifiers should not exceed 0.1 part by weight, relative to the quantity of carrier resin.

The aqueous dispersion according to the invention is preferentially suitable for the cataphoretic deposition of a coating on an electrically conducting substrate which is connected as the cathode in an electrocoating lacquering process. For carrying out the cathodic deposition, the aqueous dispersion is diluted with water down to a solids content between 5 and 30%, preferably between 5 and 15%. The pH value is between 7 and 9. During the cathodic deposition, the dispersion is kept at temperatures between 15° and 40° C. The substrate to be coated is immersed in the dispersion and is connected as the cathode. The anode used is graphite or a noble metal. A direct current is passed through the bath between the cathode and the anode. The deposition voltage is 20 to 400 volts. Under these conditions a coating is deposited on the cathode. Deposition is carried out until the desired film thickness has been achieved. It is a particular advantage that film thicknesses of up to 150 μm are obtained on the coated substrate even after a brief period. Depending on the plastic powder chosen, periods as low as 10 seconds are adequate in some cases to obtain these film thicknesses. After the substrate has been removed from the coating bath, the coating is rinsed with water and is stoved for 5 to 30 minutes at temperatures between 160° C. and 200° C. In some cases it is appropriate to interpose a brief preliminary drying at 100° C. before stoving.

It was surprising that the powder resin is deposited on the cathode together with the carrier resin. This would not have been expected, since dispersions composed of finely divided powder resin cannot be deposited by electrophoresis.

Since the electrocoating bath becomes depleted in both the carrier resin and the plastic powder during the deposition process, it is necessary to replenish the bath with these substances, so that the original composition of the aqueous dispersion is always maintained. The pH value must be kept at 7 to 9 during the whole deposition process.

The properties of the stoved coating are excellent from a technological point of view. The corrosion resistance is surprisingly good and varies with the nature of the solid powder lacquers. Using the aqueous dispersion according to the invention, a very high film thickness is achieved, which, of course, somewhat impairs the throwing power. The stoved film can be subjected without difficulty to further lacquering using conventional lacquers. The examples which follow are intended to illustrate the essence of the invention, but not to limit it. Percentages relate to percentages by weight; parts relate to parts by weight.

EXAMPLE 1 (PREPARATION OF A CARRIER RESIN)

984 parts (13.1 moles) of 40% strength formaldehyde solution are added dropwise at 20° to 25° C. to 1,100 parts (4.8 moles) of bisphenol A, 917.5 parts (8.7 moles) of diethanolamine, 332.5 parts (2.5 moles) of di-2-methoxyethylamine and 375 parts of isopropanol. The mixture is stirred for one hour under a nitrogen atmosphere at 30° C. and is then heated at 80° for 3 hours. Isopropanol and water are removed by distillation under a slight vacuum. This gives a yellow, resin-like mass with a solids content of 91%. 70 parts of paraformaldehyde are added to 2,542 parts of the above and the mixture is subjected to a condensation reaction for 9 to 10 hours at 70° C. under a nitrogen atmosphere. A Mannich base (component A) is obtained in the form of a viscous mass having a solids content of 90%.

554 parts of this Mannich base are reacted for 3 hours at 60° C. with 136.5 parts of a commercially available reaction product formed from bisphenol A and epichlorohydrin (epoxide value: 0.2) (epoxide resin Epoxy 1/33 manufactured by Chemapol) and 54.5 parts of a commercially available reaction product formed from pentaerythritol and epichlorohydrin (epoxide value: 0.57) (Epoxin 162, BASF AG), using 34 parts of dimethyl glycol ether.

This gives a clear, viscous resin having an average molecular weight of 860 and a residual formaldehyde content of 0.3%. The solids content is 70%.

EXAMPLE 2 (PREPARATION OF A NONIONIC PLASTIC POWDER)

100 parts of an epoxide resin powder formed from bisphenol A and epichlorohydrin, having a Kofler melting range of 70° to 75° C., 3 parts of a levelling agent, 20 parts of titanium dioxide (rutile grade), 8 parts of aluminum silicate, 2 parts of red iron oxide and 5 parts of a dicyandiamide derivative are melted and kneaded together in an extruder in the manner customary for the preparation of pulverulent coating agents. After solidifying the mixture is ground in a spiral jet mill to give a powder with a maximum particle size of 30 μm and an average particle size of 10 to 15 μm.

EXAMPLE 3 (PREPARATION OF A NONIONIC PLASTIC POWDER)

A. 60 parts of a pulverulent polyester resin and 50 parts of an epoxide resin formed from bisphenol A and epichlorohydrin, having a Kofler melting range of 70°–75° C., are dissolved in 290 parts of diacetone alcohol. This solution is stirred into water by means of a high-speed disperser and the resin mixture is precipitated. The precipitate is filtered off.

B. The moist filter cake is washed with water and dried in a drying oven to give a solid powder, which is then ground in a spiral jet mill to a maximum particle size of 30 μm. 95% of the powder has an average particle size distribution between 10 and 15 μm.

C. The moist precipitate obtained in accordance with A. is washed with water and filtered off again. The filter cake is suspended to form a homogeneous composition with enough water for this composition to contain one part of synthetic resin powder and two parts of water. The average particle size distribution of the powder is 5 to 10 μm; the maximum particle size is 30 μm.

EXAMPLE 4

100 parts of the carrier resin prepared in accordance with Example 1 are protonated with two parts of acetic acid and dispersed in 800 parts of completely demineralized water. 100 parts of the plastic powder obtained in accordance with Example 3B are added to this dispersion of clear lacquer while stirring well.

The solids content of the dispersion is adjusted to 12%; its pH value is 7.6. Its conductivity is 0.7 millisiemens/cm at 25° C.

A phosphatized sheet of steel is immersed in this dispersion and connected as the cathode. A sheet of stainless steel is immersed and connected as the anode.

Applying a direct current at a voltage of 250 volts and a bath temperature of 24° C., a coating was deposited on the cathode sheet for 20 seconds. The sheet which has been provided with the coating is taken out and rinsed with completely demineralized water and is then stoved for 20 minutes at 185° C. A continuous film having a film thickness of 40 to 50 μm is formed on the side of the sheet facing the anode. In the corrosion resistance test as specified in DIN 50,021, the film was still in a satisfactory condition after 1,000 hours.

EXAMPLE 5

100 parts of the carrier resin prepared in accordance with Example 1 are protonated with two parts of acetic acid and dispersed in 800 parts of completely demineralized water. 200 parts of the plastic powder obtained in accordance with Example 2 are added to this dispersion of clear lacquer, while stirring well.

The solids content of the dispersion is adjusted to 12% and its pH value is 7.6. Its conductivity is 0.7 millisiemens/cm at 25° C.

A phosphatized sheet of steel is immersed in this dispersion and connected as the cathode. A sheet of stainless steel is immersed and connected as the anode. A coating was deposited on the cathode sheet for 30 seconds, applying a direct current at a voltage of 200 volts and a bath temperature 24° C. The sheet which had been provided with the coating was taken out and rinsed with completely demineralized water and was then stoved for 20 minutes at 185° C. A continuous film with a film thickness of 80 μm is formed on the side of the sheet facing the anode. In the corrosion test as specified in DIN 50,021, the film was still in a satisfactory condition after 1,000 hours.

EXAMPLE 6

100 parts of the carrier resin obtained in accordance with Example 1 are ground for 72 hours in a ball mill with porcelain balls together with 10 parts of titanium dioxide (rutile grade), 8 parts of aluminum silicate, 2 parts of red iron oxide, 1 part of acetic acid, 600 parts of the plastic powder suspension obtained in accordance with Example 3C and 10 parts of butanol. The solids content is then adjusted to 12% with water and the resulting aqueous dispersion is deposited cathodically analogously to Example 4. The deposition voltage was 150 volts; the deposition time was 40 seconds. A film thickness of 80 μm was achieved, after stoving, on the side of the sheet facing the anode. The stoved film was polished and an alkyd resin/melamine resin stoving top lacquer was applied by the spraying process and stoved for 20 minutes at 140° C. The Erichsen deep-drawing value of the whole lacquering was 10.3 mm, the crosshatch immersion test rating was 0 and the resistance to salt spray as specified in DIN 50,021 was 0 mm, after 720 hours.

EXAMPLE 7

Example 5 was repeated, except that two parts of an octylnonylphenoxyethanol emulsifier (Triton 405 manufactured by Rohm & Haas Company, Philadelphia, U.S.) was also added in addition to the carrier resin.

The plastic powder was then stirred into the mixture containing the emulsifier. The results obtained were similar to those of Example 5.

EXAMPLE 8

A steel sheet is immersed half way in the dispersion prepared in accordance with Example 5, having a solids content of 12% and a pH value of 7.6, and is earthed via a contact. The dispersion is stirred at uniform speed and, after 20 days, no corrosion or rust phenomena can be detected on the steel sheet, specifically neither on the immersed part nor on the part not immersed.

In a comparison experiment, Example 1 of German Auslegeschrift No. 2,248,836 was repeated and, in accordance with this example, the dispersion was diluted to a solids content of 12% and adjusted to a pH value of 4.4 to 4.5. A steel sheet was also immersed in this dispersion and the dispersion was stirred continuously. After 5 days, corrosion phenomena made themselves evident on the steel sheet, specifically as pitting on the part immersed in the liquid and as rust formation on the part located above the coating bath.

This experiment demonstrates the superiority of the dispersion according to the invention over a dispersion according to the known state of the art.

We claim:

1. An article having an electrically conducting substrate and a stoved coating adhered thereto which stoved coating comprises a film baked at tempertures between 160° and 200° C., said film prepared from an aqueous solution and/or aqueous dispersion, said solution and/or dispersion being the electrodeposition bath in which said film is cathodically deposited on said substrate being connected as a cathode in the electrodeposition bath, said aqueous solution and/or dispersion comprising a reaction product protonated with acids, from the reaction of (a) Mannich bases which are free from epoxide groups with (b) epoxide resins wherein aliphatic hydroxyl groups originating from (a), (b) or a mixture thereof are at least partially converted into urethane groups by reaction with partially blocked isocyanate, said Mannich bases (a) formed from components selected from:
   ($a_1$) condensed phenols which are free from ether groups and contain at least two aromatic rings and at least two phenolic hydroxyl groups;
   ($a_2$) condensed phenols which contain ether groups and contain at least two aromatic rings and at least two phenolic hydroxyl groups;
   ($a_5$) formaldehyde or compounds which split off formaldehyde; and
   ($a_3$) secondary amines having at least one hydroxyalkyl group or a mixture of $a_3$ and (a₄) secondary dialkylamines or dialkoxyalkylamines which do not contain free hydroxyl groups or from the components (a₁) or (a₂) with (a₅) and (a₃) or a mixture of (a₃) and (a₄), the improvement which comprises said dispersion having a pH between 7 and 9 and having dispersed therein finely divided, non-ionic plastics selected from the group consisting of epoxide resins, polyester resins, acrylate resins, polyurethane resins, polyamide resins, polyethylene, polypropylene, cellulose acetobutyrates and mixtures thereof.

2. The article as claimed in claim 1, wherein the aqueous solution and/or aqueous dispersion of the reaction product which has been protonated with acids contains pigments, filler, water-miscible organic solvents or mixtures thereof.

3. The article as claimed in claim 1 wherein the finely divided plastics contain pigments, fillers or mixtures thereof.

4. The article as defined in claim 1 wherein said nonionic plastics comprise 0.1 to 100 parts by weight of plastic powder to 1 part by weight of said carrier resin product.

5. The article as defined in claim 4 wherein said plastic powder has a particle size distribution in which at least 95% of the particles are smaller than 30 microns.

6. The article as defined in claim 5, wherein said aqueous dispersion has a pH between 7 and 9.

7. The article as defined in claim 6, wherein said nonionic plastics are epoxide resins.

8. The article as defined in claim 6, wherein said nonionic plastics are polyester resins.

9. The article as defined in claim 6, wherein said nonionic plastics are polyurethane resins.

10. The article as defined in claim 6, wherein said nonionic plastics are polyamide resins.

11. The article as defined in claim 6, wherein said nonionic plastics are polyethylene.

12. The article as defined in claim 6, wherein said nonionic plastics are polypropylene.

13. The article as defined in claim 6, wherein said nonionic plastics are cellulose acetobuytrates.

14. A process for the electrophoretic deposition of a cationic resin together with a finely-divided, non-ionic plastic from an aqueous dispersion onto an electrically conducting material, connected as the cathode, wherein the deposition is carried out at a pH value between 7 and 9, said aqueous dispersion consisting of an aqueous solution and/or aqueous dispersion of a reaction product, protonated with acids, from the reaction of (a) Mannich bases which are free from epoxide groups with (b) epoxide resins wherein aliphatic hydroxyl groups originating from (a), (b) or a mixture thereof are converted, at least partially, into urethane groups by reaction with partially blocked isocyanate, said Mannich bases (a) formed from components selected from the group consisting of:

(a₁) condensed phenols which are free from ether groups and contain at least two aromatic rings and at least two phenolic hydroxy groups;

(a₂) condensed phenols which contain ether groups and contain at least two aromatic rings and at least two phenolic hydroxyl groups;

(a₅) formaldehyde or compounds which split off formaldehyde; and (a₃) secondary amines having at least one hydroxyalkyl group or a mixture of a₃ and (a₄) secondary dialkylamines or dialkoxyalkylamines which do not contain free hydroxyl groups or from the components (a₁) or (a₂) with (a₅) and (a₃) or a mixture of (a₃) and (a₄), the improvement which comprises dispersed therein finely-divided, non-ionic plastics selected from the group consisting of epoxide resins, polyester resins, acrylate resins, polyurethane resins, polyamide resins, polyethylene, polypropylene, cellulose acetobutyrates and mixtures thereof.

* * * * *